United States Patent
Taguchi (10) Patent No.: US 7,242,284 B2
(45) Date of Patent: Jul. 10, 2007

(54) TIRE CONDITION DETECTING DEVICE, TIRE CONDITION MONITORING SYSTEM, AND METHOD OF ATTACHING TIRE CONDITION DETECTING DEVICE TO TIRE WHEEL

(75) Inventor: Akihiro Taguchi, Oobu (JP)

(73) Assignee: DENSO Corporation, Kariya (JP)

( * ) Notice: Subject to any disclaimer, the term of this patent is extended or adjusted under 35 U.S.C. 154(b) by 155 days.

(21) Appl. No.: 11/063,864

(22) Filed: Feb. 24, 2005

(65) Prior Publication Data

US 2006/0038669 A1    Feb. 23, 2006

(30) Foreign Application Priority Data

Feb. 26, 2004  (JP)  ............................. 2004-051695

(51) Int. Cl.
  *B60R 15/10*  (2006.01)
  *B60C 23/02*  (2006.01)
  *B60C 19/00*  (2006.01)

(52) U.S. Cl. ................... 340/426.33; 340/442; 73/146; 73/146.5; 152/152.1

(58) Field of Classification Search .......... 340/426.33, 340/442, 445, 447, 693.9; 73/146, 146.4, 73/146.5; 152/151, 152.1
See application file for complete search history.

(56) References Cited

U.S. PATENT DOCUMENTS 4,384,482 A * 5/1983 Snyder .................. 73/146.5
4,701,742 A * 10/1987 Ruehr .................... 200/61.25
6,604,415 B2   8/2003 Imao et al. .............. 73/146.5
6,694,807 B2 * 2/2004 Chuang et al. ........... 73/146.5
6,829,925 B2 * 12/2004 Nespo et al. ............. 73/146

FOREIGN PATENT DOCUMENTS

JP    A-08-207522    8/1996
JP    A-08-219922    8/1996

* cited by examiner

*Primary Examiner*—Toan N. Pham
(74) *Attorney, Agent, or Firm*—Posz Law Group, PLC (57) ABSTRACT

A tire condition detecting device 1 and an attaching method thereof, and a tire condition monitoring system, capable of preventing the attenuation caused by tires and wheels, of radio waves transmitted from a transmission section more effectively than before, are provided. The tire condition detecting device comprises a case 3 having an insertion part 5 inserted into a hole 13 provided in a rim 12; and a sensor and transmission section 2 contained in a case main body 4. It is attached to the rim by inserting the insertion part 5 of the case into the hole of the rim from the inside of the rim so that the case main body is arranged inside the rim, that is, on a side of the rim 12 opposite to a side on which an air chamber 15 of a tire 14 is located.

15 Claims, 8 Drawing Sheets

TIRE CONDITION DETECTING DEVICE, TIRE CONDITION MONITORING SYSTEM, AND METHOD OF ATTACHING TIRE CONDITION DETECTING DEVICE TO TIRE WHEEL

BACKGROUND OF THE INVENTION

1. Field of the Invention

The present invention relates to a tire condition detecting device, a tire condition monitoring system, and a method of attaching a tire condition detecting device to a tire wheel.

2. Description of the Related Art

Figure 8:
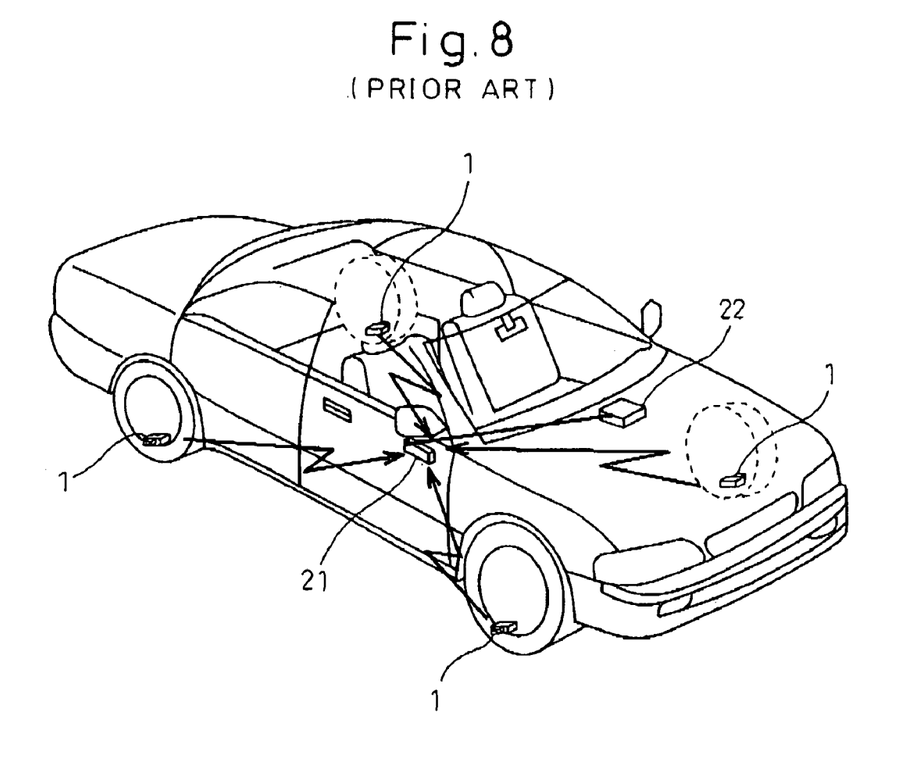
FIG. 8 is a diagram showing the configuration of a tire condition monitoring system.

FIG. 8 shows an example of a tire condition monitoring system. Conventionally, there is a tire condition monitoring system comprising a tire condition detecting device 1 provided on each tire wheel 10 and having a sensor and transmission section 2, a receiving antenna and a receiver 21 provided on a vehicle, and a meter 22 provided in a vehicle compartment.

In such a tire condition monitoring system, the condition of each tire, such as air pressure and temperature within a tire is transmitted by radio waves from the sensor and transmission section 2, the radio waves are received by the receiver 21 through the receiving antenna and, after data processing is carried out in a control circuit of the receiver 21, the condition of each tire is displayed in the meter 22. (For example, refer to Patent document 1).

Figure 9A:
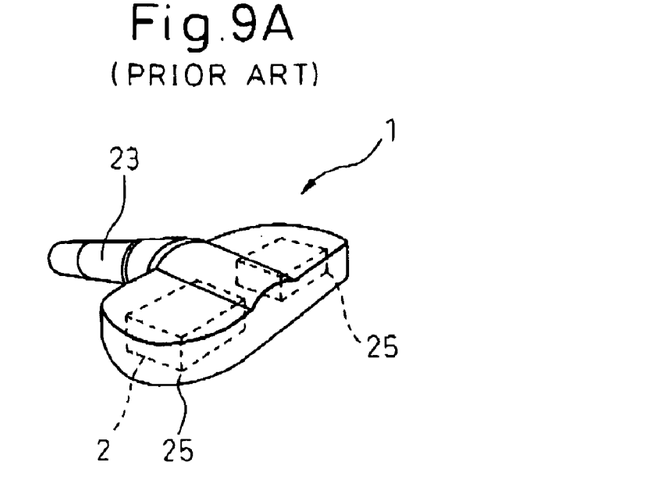
FIG. 9A is a diagram showing the configuration of a tire condition detecting device 1 of valve-integrated type.
Figure 9B:
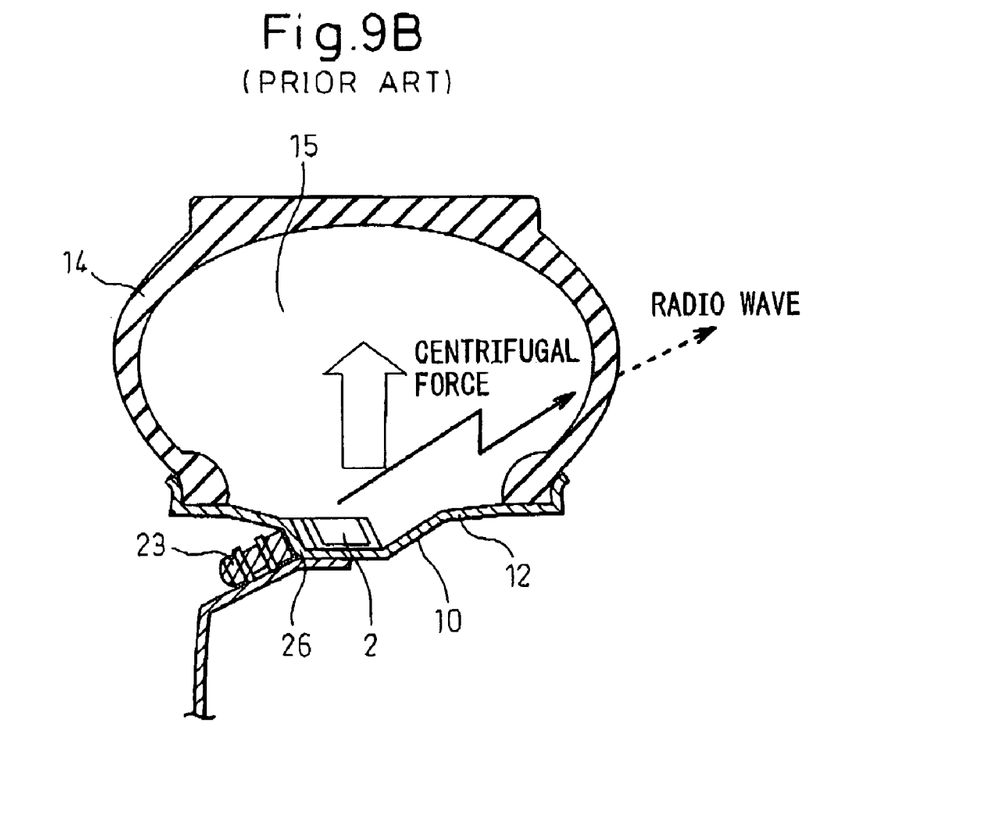
FIG. 9B is a diagram showing a state in which the tire condition detecting device 1 shown in FIG. 9A is mounted on a wheel.
Figure 10:
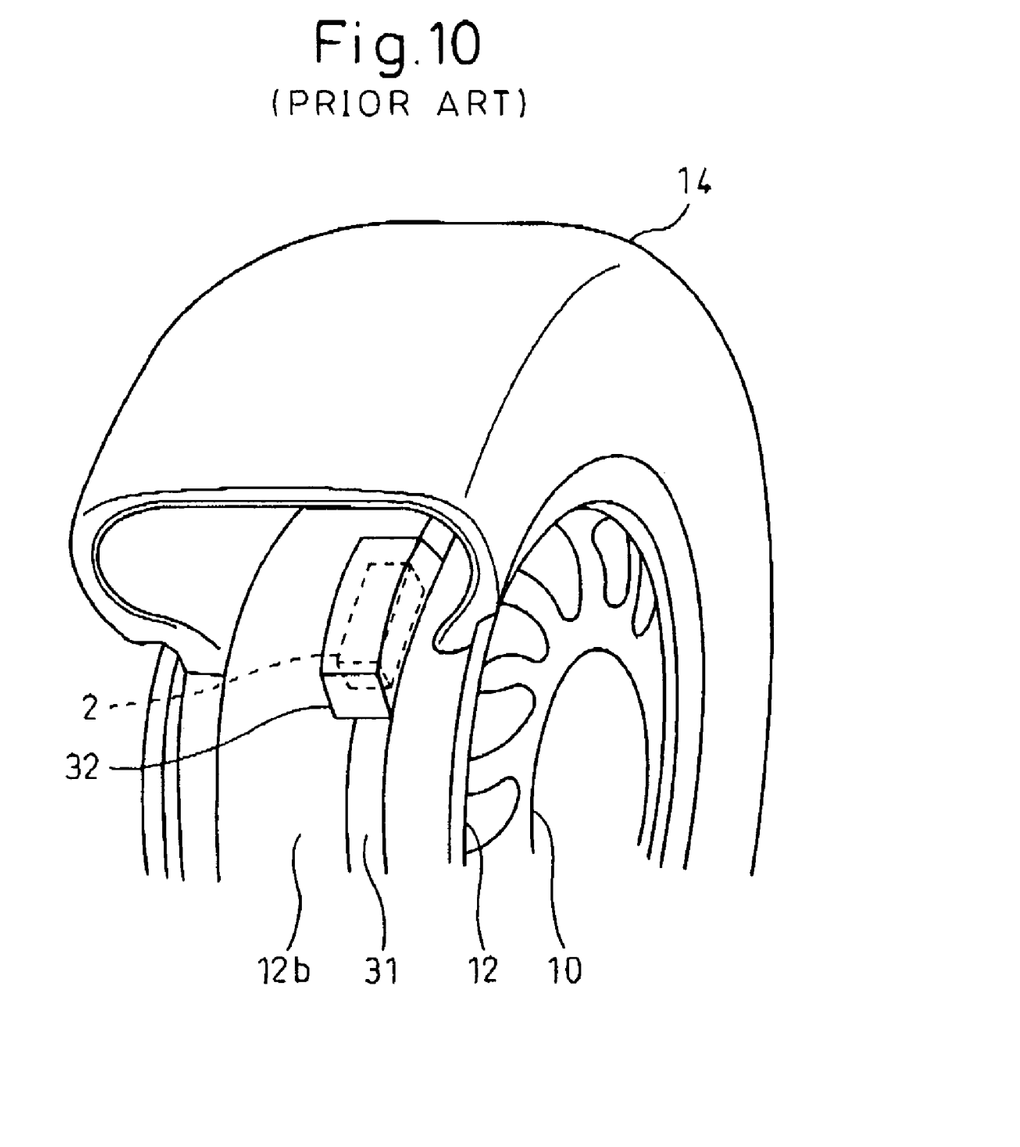
FIG. 10 is a diagram showing a tire condition detecting device 1 that is fixed on a wheel with a metal belt.

Various types of tire condition detecting device 1 are available in the market, such as a valve-integrated type or a type in which the tire condition detecting device 1 is fixed on a wheel with a metal belt. FIGS. 9A, 9B, and 10 each show the tire condition detecting device 1.

In the case of the tire condition detecting device 1 of a valve-integrated type, the sensor and transmission section 2, and a battery 25 are contained in a case 24 provided to a valve 23 as shown in FIG. 9A. Then, as shown in FIG. 9B, the case 24, in which the sensor and transmission section 2 is contained, is attached to a valve hole of a rim 12 in a state in which the case 24 is arranged in an area, in which air is present, between the rim 12 of the wheel 10 and a tire 14, that is, in an air chamber 15.

In the case of the tire condition detecting device 1 that is fixed on a wheel with a metal belt, the sensor and transmission section 2 is contained in a case 32 fixed on a metal belt 31, as shown in FIG. 10. Then, the case 32 in which the sensor and transmission section is contained is fixed on the outer surface of the rim 12, that is, a surface 12b of the rim 12 on the side of the air chamber 15 with a metal belt 31.

[Patent document 1]

Japanese Unexamined Patent Publication (Kokai) No. 2002-257661

In the two tire condition detecting devices 1 with the structures described above, each of the transmission sections 2 is arranged in the air chamber 15. Because of this, the two tire condition detecting devices 1 having these two type structures cause a problem in that the radio waves transmitted from the transmission section 2 are attenuated while passing through tires or wheels.

Generally, the wheel 10 is made of metal such as aluminum or steel. A radial tire has, in general, a body ply made of polyester or the like for supporting the entire structure and a steel ply arranged on a tread surface. However, in the case of some types of a tire, in addition to the tread surface, the side surfaces are configured of steel plies.

When the entire structure of the tire 14 is configured by metal such as in the case where not only the tread surface but also the side surface is configured of a steel ply, radio waves are unlikely to pass through the metal and the above-mentioned problem becomes more serious. Moreover, the amount of metal contained in the tire 14, etc. differs from type to type. Because of this, depending on the types of the tire 14, there is produced a variation in the degree of attenuation of the radio waves transmitted from the transmission section, leading to a variation in the level of the radio waves received by the receiver.

SUMMARY OF THE INVENTION

The above-mentioned problems being taken into account, an object of the present invention is to provide a tire condition detecting device, a tire condition monitoring system, and a method of attaching a tire condition detecting device to a wheel, capable of preventing the attenuation, which is caused by tires and wheels, of radio waves transmitted from a transmission section, more effectively than a prior art.

In order to attain the above-mentioned object, in a first aspect of the present invention, a tire condition detecting device (1) is prepared, in which a detection means (2, 2b) for detecting the conditions of a tire (14) and a transmission means (2, 2a) for transmitting the detection result detected by the detection means (2, 2b) by radio waves are contained in a case (3) having an insertion part (5) to be inserted into a hole (13), different from a vent hole of a tire valve (23) and provided in a rim (12) of a wheel (10), and a main body (4).

Then, the tire condition detecting device (1) is attached to the rim (12) by inserting the insertion part (5) into the hole (13) of the rim from a side of the rim (12) opposite to a side on which an air chamber (15) is located in a state in which the transmission means (2, 2a) is contained in the main body (4) so that the main body (14) is arranged on the side of the rim (12) opposite to the side on which the air chamber (15) is located.

In the present invention, the tire condition detecting device is attached to a wheel so that the transmission means is located not between the tire and the wheel but at the outside thereof. Due to this, it is possible for the radio waves transmitted from the transmission means to reach the receiver provided in a vehicle without passing through the tire or the wheel.

Therefore, according to the present invention, it is possible to prevent the attenuation, which is caused by the tire and the wheel, of the radio waves transmitted from the transmission section more effectively than in conventional cases.

In a second aspect of the present invention, the main body (4) has a bulging part (4a) that bulges out from the insertion part (5) when the case (3) is viewed in a direction opposite to a direction in which the insertion part (5) is inserted into the hole (13) of the rim, and the tire condition detecting device (1) can be attached to the rim (12) in a state in which the bulging part (4a) is in contact with a surface (12a) of the rim (12) on a side opposite to a side on which the air chamber is located.

By attaching the tire condition detecting device to the rim in this manner, it is possible to establish a state in which the bulging part is caught by the surface of the rim on the side opposite to the side on which the air chamber is located when the centrifugal force produced by rotation of the tire acts on the tire condition detecting device while a vehicle is traveling. Due to this, according to the present invention, it is possible to prevent the tire condition detecting device from being separated from the rim even if a centrifugal force produced by the rotating tire acts thereon.

In a third aspect of the present invention, by using the tire condition detecting device (1) having a protruding part (5a, 5d), provided at a front end of the insertion part (5) and protruding in a direction perpendicular to a direction in which the insertion part (5), is inserted into the hole (13) of the rim, the tire condition detecting device (1) can be attached to the rim (12) in a state in which the protruding part (5a, 5d) is made to come into contact with an area around the hole (13) of the rim on the surface (12b) of the rim at the air chamber side of the rim when the insertion part (5) is inserted into the hole (13) of the rim.

In a fourth aspect of the present invention, by using the tire condition detecting device (1) having a screw groove (5e) provided on a surface of the insertion part (5), the tire condition detecting device (1) can be attached to the rim (12) by screwing the insertion part (5) into the hole (13) of the rim.

A fifth aspect of the present invention is characterized by comprising the case (3) having the insertion part (5) to be inserted into the hole (13) of the rim and the main body (4) to be arranged on a side of the rim (12) opposite to a side on which the air chamber (15) is located, the detection means (2, 2b) contained in the case (3) and detecting condition of a tire through the hole (13) of the rim (12), and the transmission means (2, 2a) contained in the main body (4) of the case (3) and transmitting detection result detected by the detection means (2, 2b) by radio waves.

The tire condition detecting device according to the present invention is used, for example, in the invention according to the first aspect.

As shown in a sixth aspect, the main body (4) can be made into a shape having the bulging part (4a) that bulges out from the insertion part (5) when viewing the case (3) in a direction opposite to a direction in which the insertion (5) is inserted into the hole (13) of the rim, in the tire condition detecting device according to the fifth aspect.

The tire condition detecting device according to the sixth aspect is used, for example, in the invention according to the second aspect.

As shown in a seventh aspect of the present invention, the insertion part (5) may be formed in a shape having the protruding part (5a, 5d), which protrudes in a direction perpendicular to a direction in which the insertion part (5) is inserted into the hole (13) of the rim, at the front end thereof.

As shown in an eighth aspect of the present invention, a surface of the insertion part (5) may be provided with the screw groove (5e).

A ninth aspect of the present invention is characterized in that the detection means (2, 2b) and the transmission means (2, 2a) are contained in a case (3) having an insertion part (5) to be inserted into the hole (13), different from a vent hole of a tire valve (23) and provided in the rim (12) of the wheel (10), and the case (3) is attached to the rim (12) by inserting the insertion part (5) into the hole (13) of the rim from a side of the rim (12) opposite to a side on which the air chamber (15) is located in a state in which the transmission means (2, 2a) is arranged on the side of the rim (12) opposite to the side on which the air chamber (15) is located.

In the tire condition monitoring system of the present invention, the transmission means is located not between the tire and the wheel but at the outside thereof and, therefore, it is possible for the radio waves transmitted from the transmission means to reach the receiver provided in a vehicle without passing through the tire or the wheel.

Therefore, according to the present invention, it is possible to prevent the attenuation, which is caused by the tire and the wheel, of the radio waves transmitted from the transmission means more effectively than conventional cases.

As shown in a tenth aspect of the present invention, the case (3) may be formed in a shape having the bulging part (4a) that bulges out from the insertion part (5) when the case (3) is viewed in a direction opposite to a direction in which the insertion part (5) is inserted into the hole (13) of the rim. Then, the case (3) may be attached to the rim (12) in a state in which the bulging part (4a) is in contact with a surface (12a) on a side of the rim opposite to a side on which the air chamber is located.

Due to this, the tire condition detecting device can be fixed on the wheel in a state in which the protruding part of the case is pressed against the rim by the centrifugal force produced by the rotation of the tire while a vehicle is traveling. Therefore, according to the present invention, the insertion part can have a simple structure in which the insertion part is prevented from being separated from the rim even if the internal pressure of the tire acts thereon.

Moreover, as shown in an eleventh aspect of the present invention, the insertion part (5) can be formed in a shape having the protruding part (5a, 5d), provided at a front end thereof and protruding in a direction perpendicular to a direction in which the insertion part (5) is inserted into the hole (13) of the rim. Then, the case (3) can be attached to the rim (12) in a state in which the protruding part (5a, 5d) of the insertion part (5) is in contact with an area around the hole (13) of the rim on the surface (12b) of the rim at the air chamber side of the rim (12).

As shown in a twelfth aspect of the present invention, the case (3) may be attached to the rim (12) by providing the screw grooves (5e) corresponding to each other on both a surface of the insertion part (5) and a surface provided with the hole (13) of the rim and by screwing the insertion part (5) into the hole (13) of the rim.

The symbols in the parenthesis attached to each means described above indicate a correspondence with a specific means in the embodiments to be described later.

The present invention may be more fully understood from the description of the preferred embodiments of the invention set forth below, together with the accompanying drawings.

DESCRIPTION OF THE PREFERRED EMBODIMENTS

First Embodiment

A tire condition monitoring system in a first embodiment differs from the tire condition detecting device 1 explained above in "Description of the Related Art" in the structure and the attaching method to a wheel of the tire condition detecting device 1. Therefore, only the structure and the attaching method to a wheel of the tire condition detecting device 1 are explained below.

Figure 1A:
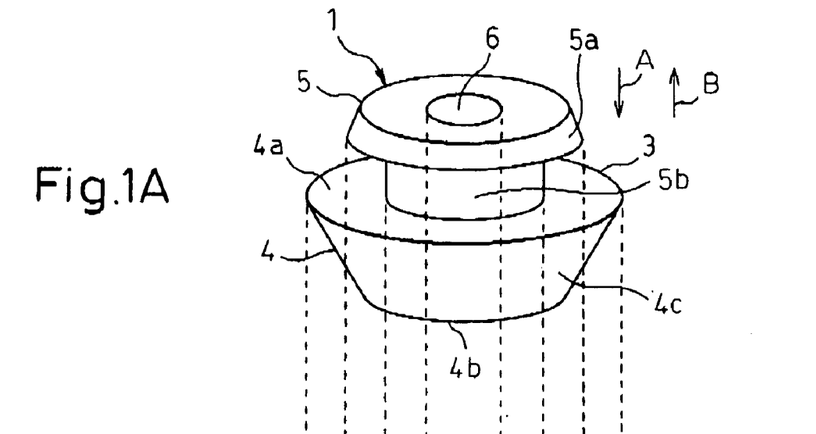
FIG. 1A is a perspective view of a tire condition detecting device 1 in a first embodiment of the present invention.
Figure 1B:
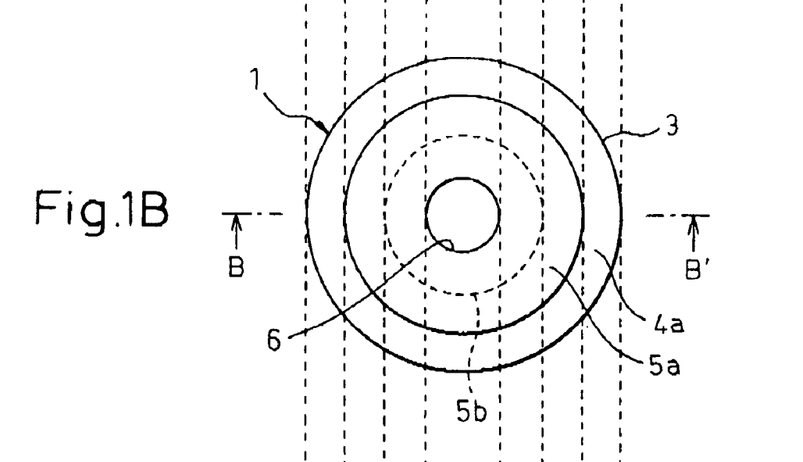
FIG. 1B is a diagram showing the tire condition detecting device 1 in FIG. 1A when viewed in the direction of the arrow A.
Figure 1C:
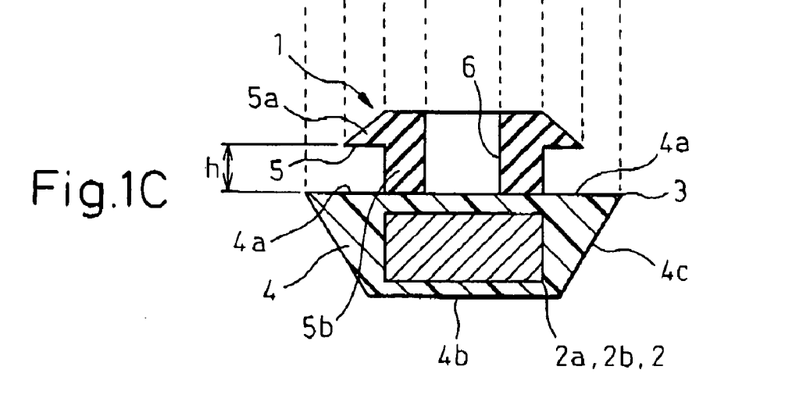
FIG. 1C is a sectional view of the tire condition detecting device 1 along the B-B' line in FIG. 1B.
Figure 2:
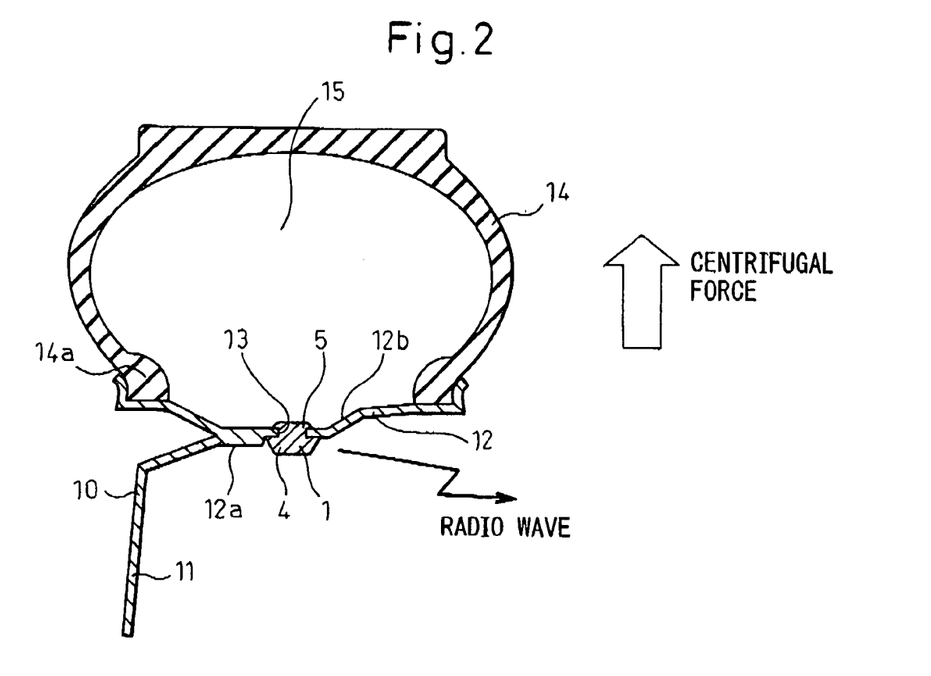
FIG. 2 is a diagram showing a state in which the tire condition detecting device 1 shown in FIGS. 1A to 1C is attached to a tire wheel.

FIGS. 1A, 1B, and 1C show a tire condition detecting device 1 in the first embodiment of the present invention. FIG. 1A is a perspective view of the tire condition detecting device 1, FIG. 1B is a diagram showing the tire condition detecting device 1 in FIG. 1A when viewed in the direction of the arrow A, and FIG. 1C is a sectional view of the tire condition detecting device 1 along the B-B' line in FIG. 1B. FIG. 2 is a diagram showing a state in which the tire condition detecting device 1 shown in FIGS. 1A to 1C is attached to a tire wheel. As shown in FIG. 2, the tire condition detecting device 1 in the present embodiment is attached to the inside of a wheel 10.

As shown in FIGS. 1A to 1C, the tire condition detecting device 1 comprises a sensor and transmission section 2, and a case 3 containing the sensor and the transmission section 2. When the tire condition detecting device 1 is attached to the wheel 10, the upper side in FIGS. 1A and 1C is the side on which a tire 14 is located and the lower side is the side on which the rotating shaft of the tire is located.

A sensor 2b of the sensor and transmission section 2 measures the condition of the tire such as air pressure or temperature in the tire. An air pressure sensor, a temperature sensor, etc., which are generally used, is used as the sensor 2b. The sensor 2b corresponds to the detection means in the present invention. Moreover, a transmission part 2a has an antenna, not shown here, from which radio waves containing the measurement result of the sensor 2b are transmitted. The transmission part 2a corresponds to the transmission means in the present invention.

The case 3 comprises a case main body 4 and an insertion part 5. The case main body 4 and the insertion part 5 correspond to the main body and the insertion part in the present invention, respectively. In the case main body 4, the sensor and transmission section 2 is contained. The insertion part 5 is a portion of the case 3, which is inserted into a hole 13, different from the vent hole of a tire valve and provided in a rim 12. The case main body 4 is made of resin such as ABS or PBT, and the insertion part 5 is made of, for example, elastomer having an elasticity like that of rubber.

As shown in FIGS. 1A to 1C, the case main body 4 has a circular top surface 4a and a circular bottom surface 4b smaller than the top surface in diameter and a side surface 4c connecting the top surface 4a and the circular bottom surface 4b. In other words, the case main body 4 shown in FIGS. 1A to 1C has a shape of a reversed truncated cone that is formed by cutting a cone with a plane parallel to its base and by reversing it.

The top surface 4a of the case main body 4 is larger in outer diameter than a cylindrical part 5b of the insertion part 5, which will be described later. In other words, the top surface 4a of the case main body 4 has a shape that bulges out from the cylindrical part 5b of the insertion part 5, not equal thereto in size, when viewing the case 3 in the direction of the arrow A in FIG. 1A, as shown in FIG. 1B. The top surface 4a of the case main body 4 corresponds to the bulging part in the present invention.

Moreover, the top surface 4a of the case main body 4 is larger in area than the hole 13 of the rim 12 and the case main body 4 has a thick shape whose diameter is greater than that of the hole 13 of the rim 12. Due to this, when the insertion part 5 is inserted into the hole 13 of the rim 12, the case main body 4 is unlikely to pass through the hole 13 and the top surface 4a comes into contact with the rim 12.

The top surface 4a of the case main body 4 is a flat surface as the peripheral area of the hole 13 provided in the rim 12, which is an inner surface 12a of the rim 12.

The insertion part 5 is provided in the center of the top surface 4a of the case main body 4. The insertion part 5 has a shape vertically protruding from the top surface 4a of the case main body 4. The insertion part 5 has the cylindrical part 5b having a cylindrical shape and a flange-shaped part 5a formed at the front end, that is, at the upper side in the figure, as shown in FIGS. 1A and 1C.

The outer diameter of the cylindrical part 5b of the insertion part 5 is approximately equal to or slightly greater than the diameter of the circular hole 13, different from the valve hole and provided in the wheel 10, as shown in FIG. 2. Then, the height h of the cylindrical part 5b is approximately equal to the thickness of the rim 12.

The cylindrical part 5b is provided with a hole 6 formed in the center thereof, as shown in FIGS. 1A and 1B. The hole 6 has a depth that reaches the case main body 4. As shown in FIG. 2, when the tire condition detecting device 1 is attached to the wheel 10, the sensor 2b contained in the case main body 4 can measure pressure etc. in an air chamber 15 of the tire 14 through this hole on the basis of the pressure values stored in advance in the sensor 2b itself.

On the other hand, as shown in FIG. 1B, the outer diameter of the flange-shaped part 5a of the insertion part 5 is greater than that of the cylindrical part 5b and the flange-shaped part 5a has a shape protruding in the radial direction from the cylindrical part 5b, as shown in FIGS. 1A and 1C. Due to this, after the insertion part 5 is inserted into the hole 13 of the rim 12, when a tensile stress is applied in the opposite direction to that in which the insertion part 5 is inserted, the flange-shaped part 5a of the insertion part 5 is caught by the surface 12b of the rim 12 on the side of the air chamber 15.

Although not shown schematically, a battery to supply power to the sensor and transmission section 2 is contained in the case main body 4 of the case 3.

In the case of the tire condition detecting device 1 having the above-mentioned structure, the insertion part 5 is inserted into the hole 13 provided on the rim 12 from a position inside the rim 12 in the direction of the arrow B in FIG. 1A, as shown in FIG. 2. Here, the position inside the rim 12 is a position nearer to a disk 11 of the wheel 10 than to the rim 12. In other words, the position inside the rim 12 is a side of the rim 12 opposite to a side on which the air chamber 15 is located.

Although the outer diameter of the flange-shaped part 5a of the insertion part 5 is greater than the diameter of the hole 13 of the rim 12, the flange-shaped part 5a is made of elastomer having rubber-like elasticity and, therefore, it is possible to insert the insertion part 5 into the hole 13 of the rim 12 by deforming the flange-shaped part 5a.

When the insertion part 5 is inserted into the hole 13 of the rim 12, as the flange-shaped part 5a of the insertion part 5 protrudes from the cylindrical part 5b in the direction perpendicular to the inserting direction shown by the arrow B in FIG. 1A, the flange-shaped part 5a comes into contact with the peripheral area of the hole 13 on the surface 12b of the rim 12 at the air chamber 15 side thereof. As the top surface 4a of the case main body 4 is larger than the hole 13 of the rim 12, the top surface 4a comes into contact with the peripheral area of the hole 13 on the inner surface 12a of the rim 12.

As described above, the tire condition detecting device 1 is fixed on the rim 12 in a state in which the case main body 4 is arranged at a position inside the rim 12.

As the need arises, a liquid seal material, double-sided tape, or an elastic seal material such as rubber or elastomer may be arranged on the contact area between the rim 12 and the case 3. Due to this, the level of hermeticity within the tire 14 can be increased.

For example, the tire condition detecting device 1 having the above-mentioned structure can be manufactured as follows. The case 3 formed from resin and the sensor and transmission section 2 are prepared. As the sensor and transmission section 2, those manufactured by a general method can be used. As the method for manufacturing the case 3, for example, a two-material molding method using ABS and elastomer can be employed. That is, the case main body 4 is formed from ABS, then the insertion part 5 is formed from elastomer, so that the case 3 is integrally formed into a single unit. The plural components of the case 3 are formed separately and then these components are joined together and thus the shape of the case 3 shown in FIGS. 1A to 1C is formed.

The sensor and transmission section 2 is put into a separated part of the case 3, and by joining the separated parts of the case 3, the tire condition detecting device 1 is completed.

As described above, the tire condition detecting device 1 in the present embodiment comprises: the case 3 having the insertion part 5 to be inserted into the hole 13 provided in the rim 12 and the case main body 4; and the sensor and transmission section 2 contained in the case main body 4.

In the present embodiment, the case 3 is attached to the rim 12 by inserting the insertion part 5 of the case 3 into the hole 13 of the rim 12 from the inside of the rim 12 so that the case main body 4 of the tire condition detecting device 1 is arranged inside the rim 12.

In the present embodiment, therefore, the transmission part 2a is arranged inside the rim 12, that is, on the side of the rim 12 opposite to a side on which the air chamber 15 of the tire is located. Due to this, in the case of the tire condition detecting device 1 of the present embodiment, when the transmission part 2a transmits radio waves, the transmitted radio waves can reach the receiver provided in a vehicle without passing through the tire 14 or the wheel 10.

Because of this, according to the present embodiment, it is possible to prevent the attenuation, which is caused by the tire 14 and the wheel 10, of the radio waves transmitted from the transmission part 2s more effectively compared to the conventional tire condition detecting device 1.

As a result, the tire condition detecting device 1 in the present embodiment has the following effects because of the more excellent radio wave propagation ability compared to the conventional tire condition detecting device 1.

According to the tire condition detecting device 1 in the present embodiment, the transmission output power of radio wave in the transmission part 2a can be made lower than that of the conventional tire condition detecting device 1. This is because it is necessary to set a high transmission output power in advance, the attenuation of radio wave caused by a tire being taken into consideration, in the case of the conventional tire condition detecting device 1, but in the case of the tire condition detecting device 1 in the present embodiment, it is no longer necessary to take into account the attenuation of radio waves caused by a tire.

Because of this, the power consumed by the transmission part 2a can also be reduced and, therefore, a battery to be contained in the case main body 4 can be reduced in size. As a result, the tire condition detecting device 1 in the present embodiment can be made lighter compared to the conventional tire condition detecting device 1.

Moreover, in the case of the conventional tire condition detecting device 1, as shown in FIG. 8, when a receiving antenna is attached to a vehicle, it is necessary to determine an area of the vehicle to which the antenna for a vehicle is attached so that the antenna can receive the radio waves transmitted from all of the tire condition detecting devices 1 attached to the respective tires, while taking into account the attenuation of radio wave caused by tires. Therefore, when the conventional tire condition detecting device 1 is used, the area of the vehicle to which the receiving antenna on a vehicle side can be attached is limited.

In contrast to this, according to the tire condition detecting device 1 of the present embodiment, it is not necessary to take into account the attenuation of radio wave caused by tires and wheels, as is necessary conventionally and, therefore, the area to which the antenna for a vehicle can be attached is extended compared to the conventional tire condition detecting device 1. In other words, according to the tire condition detecting device 1 in the present embodiment, even if the output of radio waves of the transmission part 2a is weak, the communication range can be extended compared to the case of the conventional tire condition detecting device 1. Because of this, according to the tire condition detecting device 1 in the present embodiment, the degree of freedom in attaching the antenna on a vehicle side can be increased.

Regarding the communication between the tire condition detecting device 1 and a receiver 21 on a vehicle side, it may be possible to establish two-way communication between the tire condition detecting device 1 and a transmitter for a vehicle and between the tire condition detecting device 1 and the receiver 21 for a vehicle by providing a receiver on the tire condition detecting device 1 and a transmitter on the vehicle. In this case, even if the output of radio wave is weak, it is required for both the receivers to receive radio waves.

Concerning this point, in the case of the tire condition detecting device 1 in the present embodiment, the attenuation of radio wave caused by tires etc. is reduced compared to the conventional case and, therefore, even if the output of radio wave of the transmission part 2a is weak compared to the case of the conventional tire condition detecting device 1, communication between the transmission part 2a of the tire and the receiver on a vehicle side can be established.

Therefore, according to the tire condition detecting device 1 in the present embodiment, two-way communication between it and the transmitter and the receiver for a vehicle can be realized easily. Due to this, when a transmission request signal is issued from the transmitter on a vehicle side and the tire condition detecting device 1 receives the transmission request signal, it is possible to transmit the detection result of the sensor from the tire condition detecting device 1 toward the receiver on a vehicle side.

In this case, with the view of establishing without fail the two-way communication between the tire condition detecting device 1 and the vehicle side, it is preferable for the antenna for a vehicle to be mounted onto each wheel house (well).

Moreover, methods for supplying power to the tire condition detecting device 1 may include, in addition to the method using a battery, a method in which radio waves are transmitted from the outside of the tire condition detecting device 1 and the radio waves transmitted from the outside are converted into power in the tire condition detecting device 1.

Even if it is attempted to realize this method by using the conventional tire condition detecting device 1 described in "Description of Related Art" in this specification, the radio waves that reach the transmission section of the tire condition detecting device 1 are weak because of the attenuation of the radio waves caused by tires and therefore the power to be supplied is small.

In this case, in order to ensure power required by the transmission section of the tire condition detecting device 1, the transmission time of radio waves may be lengthened or strong radio waves may be transmitted to the transmission section of the tire condition detecting device 1.

However, due to the rotation of tire or the directivity of the antenna, etc. the transmission section of the tire condition detecting device 1 cannot receive radio waves from the outside. Because of this, the transmission time cannot be lengthened. Moreover, because radio waves available for use are limited by the Radio Law, it is not possible to freely use strong radio waves.

Because of this, it is difficult for the conventional tire condition detecting device 1 to supply power to the transmission section in the form of radio waves.

In contrast to this, as the attenuation of radio wave caused by tires etc. can be reduced, when radio waves of the same level as those transmitted to the conventional tire condition detecting device 1 are transmitted to the tire condition detecting device 1 in the present embodiment, the level of the radio waves received by the transmission part 2a are stronger than that received by the conventional tire condition detecting device 1.

As a result, according to the tire condition detecting device 1 in the present embodiment, power in the form of radio waves can be supplied to the transmission part 2a without the need to use, in particular, strong radio waves unlike the conventional tire condition detecting device 1.

Due to this, according to the tire condition detecting device 1 in the present embodiment, it becomes easier to eliminate a battery compared to the case of the conventional tire condition detecting device 1.

In the present embodiment, the tire condition detecting device 1 is attached to the rim 12 in a state in which the top surface 4a of the case main body 4 is made to come into contact with the area around the hole 13 on the inner surface 12a of the rim 12.

As a result, in the case of the tire condition detecting device 1 in the present embodiment, when the centrifugal force produced by the rotating tire acts on the tire condition detecting device 1 while the vehicle is traveling, the top surface 4a of the case main body 4 is caught by the inner surface 12a of the rim 12. Due to this, the tire condition detecting device 1 in the present embodiment is prevented from coming off the rim 12 even if a centrifugal force produced by the rotating tire acts thereon.

When the centrifugal force produced by the tire rotation acts on the tire condition detecting device 1, the centrifugal force acts on the case main body 4 so as to press the case main body 4 against the rim 12. Because of this, it is not necessary to fix the tire condition detecting device 1 in the present embodiment using a metal belt, etc. to resist the centrifugal force unlike the tire condition detecting device 1 that needs to be fixed on the wheel 10 with a metal belt 31 to prevent the case 3 from being separated. Therefore, according to the present embodiment, the tire condition detecting device 1 can be formed in a simple structure that is required only to hermetically seal the space between the rim 12 and the tire condition detecting device 1.

In the present embodiment, the tire condition detecting device 1 is attached to the rim 12 in a state in which the insertion part 5 is inserted into the hole 13 of the rim 12 and the flange-shaped part 5a of the insertion part 5 is made to come into contact with the area around the hole 13 on the surface 12b of the rim 12 on the air chamber 15 side thereof.

Because of this, when the internal pressure of the tire 14 acts on the tire condition detecting device 1 in the present embodiment, the flange-shaped part 5a of the insertion part 5 is caught by the rim 12. Due to this, the tire condition detecting device 1 in the present embodiment is prevented from being separated from the rim 12 even if the internal pressure of the tire 14 acts thereon.

Moreover, in the present embodiment, the diameter of the cylindrical part 5b of the insertion part 5 is substantially the same as that of the hole 13 of the rim 12 and the height h of the cylindrical part 5b is substantially the same as the thickness of the rim 12. Because of this, in the present embodiment, it is possible to attach the case 3 to the rim 12 without producing a space between the case 3 and the hole 13 of the rim 12. In the present embodiment, as described above, the tire condition detecting device 1 is fixed on the rim 12 and, therefore, it is possible to prevent the tire condition detecting device 1 from rattling while the vehicle is traveling.

In the case of the conventional tire condition detecting device 1 of valve-integrated type, the centrifugal force produced by the tire rotation acts on the tire condition detecting device 1 in the direction shown by the arrow in FIG. 9B while the vehicle is traveling and, therefore, a connection part 26 between the tire condition detecting device 1 and the rim 12 is required to have a specific strength.

Therefore, in the case of the tire condition detecting device 1 of valve-integrated type, the specific strength of the connection part 26 is ensured by making the connection part 26 of metal and increasing the volume of the connection part 26.

However, the tire condition detecting device 1 of valve-integrated type is heavy because the connection part 26 is made of metal. Therefore, when the tire condition detecting device 1 of valve-integrated type is attached to the wheel 10, the load of the tire condition detecting device 1 of valve-integrated type is imposed on the wheel 10, and this is undesirable from the standpoint of wheel balance.

In contrast to this, in the case of the tire condition detecting device 1 in the present embodiment, the top surface 4a of the case main body 4 is caught by the inner surface 12a of the rim 12 by the centrifugal force produced by the tire rotation, as described above. In other words, in the case of the tire condition detecting device 1, the centrifugal force produced by the tire rotation acts on the area of the rim 12 where the top surface 4a of the case main body 4 comes into contact.

Therefore, in the present embodiment, if the case main body 4 is made of resin instead of metal, it is possible to make the tire condition detecting device 1 withstand the centrifugal force produced by the rotation of the tire by ensuring a sufficient contact area between the top surface 4a of the case main body 4 and the rim 12. Because of this, according to the present embodiment, the weight of the tire condition detecting device 1 can be made lighter than the conventional tire condition detecting device 1 of valve-integrated type.

Moreover, the tire condition detecting device 1 in the present embodiment is fixed on the rim 12 by inserting the insertion part 5 into the hole 13 of the rim 12. Therefore, the tire condition detecting device 1 in the present embodiment can be attached to the wheel 10 more easily compared to the case of the above-mentioned tire condition detecting device 1 that is fixed on the wheel 10 using the metal belt 31.

The tire 14 is attached to the wheel 10 in such a manner that a bead 14a of the tire 14 is made to slide on the surface of the rim 12 at the air chamber 15 side of the rim 12. As a result, when the tire condition detecting device 1 is fixed on the surface of the rim 12 at the air chamber 15 side thereof, the tire condition detecting device 1 needs to be formed into a shape that can prevent it from being damaged by the bead 14a of the tire 14 which may hit the tire condition detecting device 1 when the tire 14 is attached to the wheel 10.

In contrast to this, the tire condition detecting device 1 in the present embodiment is attached to the inner surface 12a of the rim 12 and, therefore, the shape thereof is not restricted and it is possible to freely design the shape of the tire condition detecting device 1.

In the present embodiment, an example in which the insertion part 5 is made of elastomer is explained, but the insertion part 5 may be made of an elastic material such as rubber, as will be described below.

Figure 3:
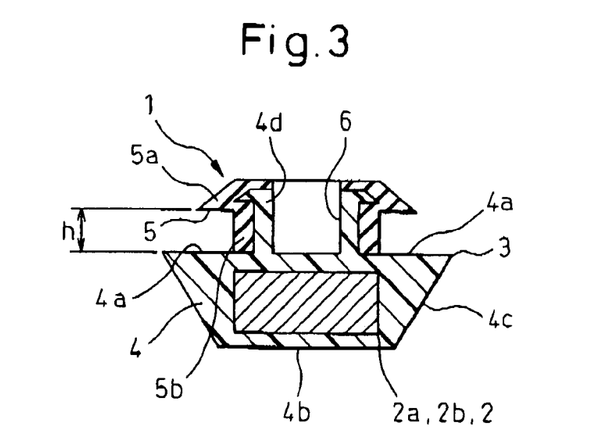
FIG. 3 is a sectional view of a tire condition detecting device 1 in another example of the first embodiment.

FIG. 3 shows a sectional structure of the tire condition detecting device 1 in another example of the present embodiment. FIG. 3 is a diagram corresponding to FIG. 1C. As shown in FIG. 3, the case main body 4 is formed in a shape in which the top surface 4a of the case main body 4 has a catch part 4d. Further, it is also formed so as to have a groove corresponding to the catch part 4d of the case main body 4. Due to this, the catch part 4d of the case main body 4 is caught by the groove provided inside the insertion part 5, therefore, the case main body 4 and the insertion part 5 can be fixed to each other.

When the tire condition detecting device 1 having such a structure is manufactured, the case main body 4 having the shape shown in FIG. 3 is formed from resin. Further, the insertion part 5 having the shape shown in FIG. 3 is formed from rubber separately. The sensor and transmission section 2 are put in the case main body 4. After this, as shown in FIG. 3, the catch part 4d of the case main body 4 is inserted into the groove of the insertion part 5. Due to this, the tire condition detecting device 1 is completed.

Second Embodiment

Figure 4A:
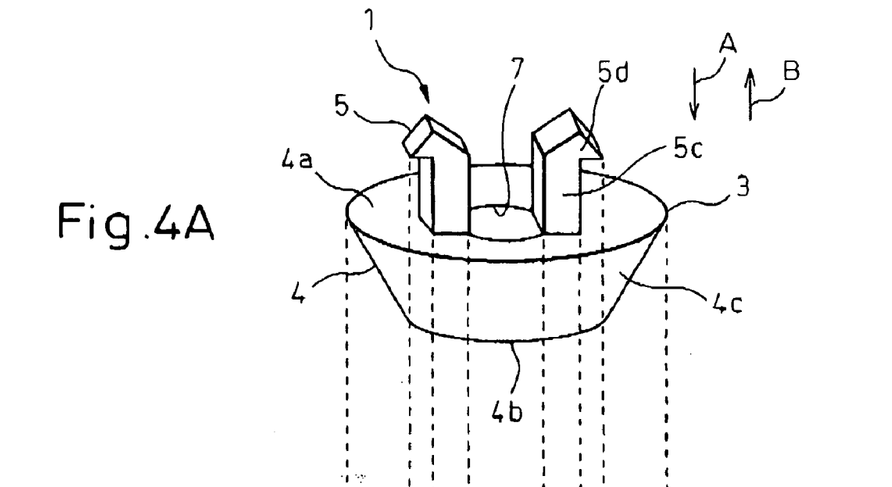
FIG. 4A is a perspective view of a tire condition detecting device 1 in a second embodiment of the present invention.
Figure 4B:
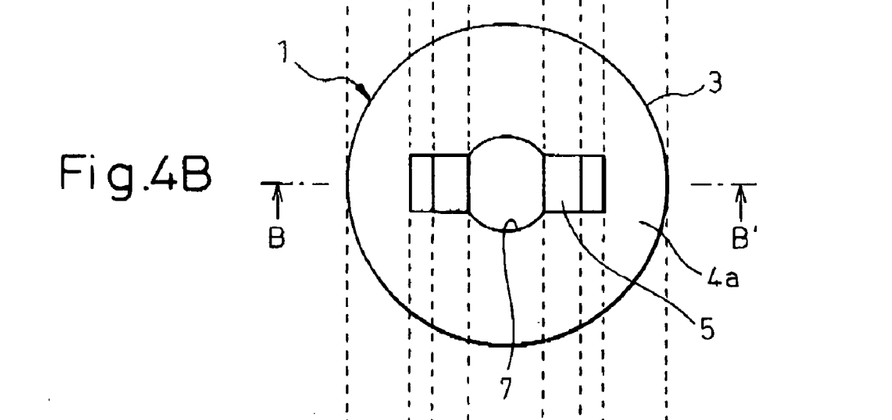
FIG. 4B is a diagram showing the tire condition detecting device 1 in FIG. 4A when viewed in the direction of the arrow A.
Figure 4C:
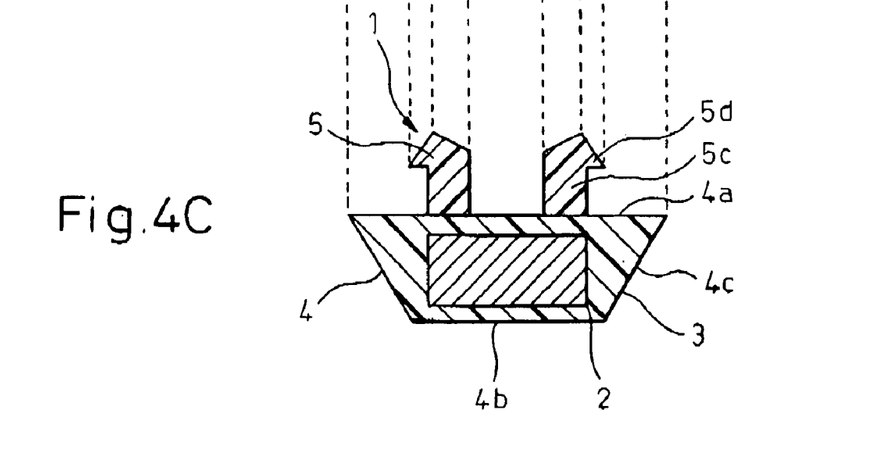
FIG. 4C is a sectional view of the tire condition detecting device 1 along the B-B' line in FIG. 4B.

FIGS. 4A, 4B, and 4C show a tire condition detecting device 1 according to a second embodiment of the present invention. FIGS. 4A, 4B, and 4C correspond to FIGS. 1A, 1B, and 1C, respectively. In FIGS. 4A to 4C, the same symbols used in FIGS. 1A to 1C are attached to the same components as those in FIG. 1A to 1C.

In the first embodiment, an example is explained, in which the protruding flange-shaped part 5a of the insertion part 5 inserted into the hole 13 of the rim 12 is made to come into contact with the area of the entire periphery of the hole 13 on the surface 12b of the rim 12 at the air chamber 15 side thereof, but it may be possible, as shown in the present embodiment, to attach the tire condition detecting device 1 to the rim 12 by making the protruding part catch a part of the periphery of the hole 13 instead of the entire periphery thereof.

In the present embodiment, as shown in FIGS. 4A to 4C, the insertion part 5 has two prism-shaped parts 5c and protruding parts 5d provided at the front ends of the respective prism-shaped parts. The protruding part 5d protrudes in the transverse direction from the prism-shaped part 5c as shown in FIGS. 4A and 4C. The insertion part 5 is made of, for example, resin and the case main body 4 and the insertion part 5 are integrally formed into one unit.

The top surface 4a of the case main body 4 is provided with a hole 7 in order to allow the sensor 2b to measure air pressure etc. of the tire when the tire condition detecting device 1 is attached to the rim 12. In this embodiment also, the top surface 4a of the case main body 4 has a shape, as shown in FIG. 4B, which bulges out from the insertion part 5, not equal to the insertion part 5 in size, when viewed in the direction of the arrow A in FIG. 4A.

In the case of the tire condition detecting device 1 also, the insertion part 5 is inserted into the hole 13 of the rim 12. At this time, as in the first embodiment, the insertion part 5 is inserted into the hole 13 of the rim 12 by being deformed toward the center. Then, after the insertion part 5 is inserted into the hole 13 of the rim 12, the protruding part 5d of the insertion part 5 catch parts of the peripheral area of the hole 13 on the surface 12b of the rim at the air chamber 15 side of the rim 12.

Third Embodiment

Figure 5A:
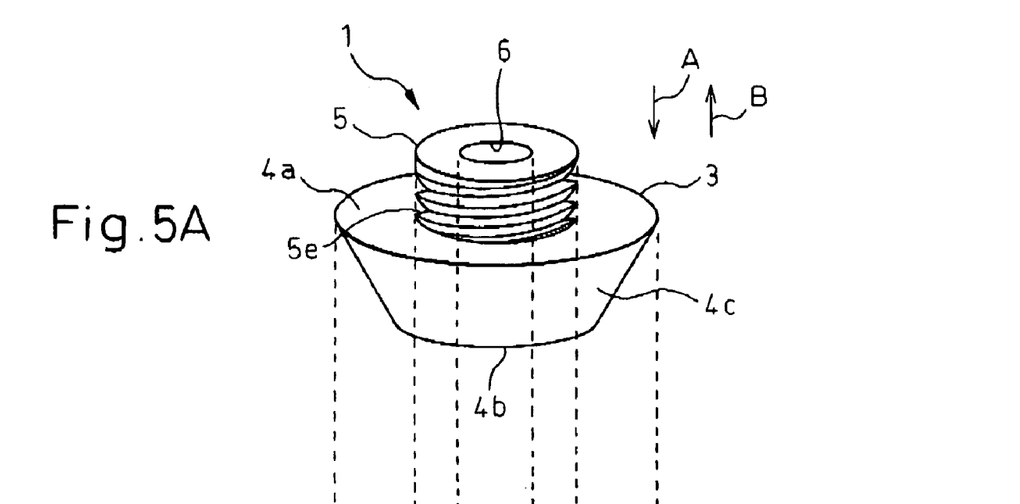
FIG. 5A is a perspective view of a tire condition detecting device 1 according to a third embodiment of the present invention.
Figure 5B:
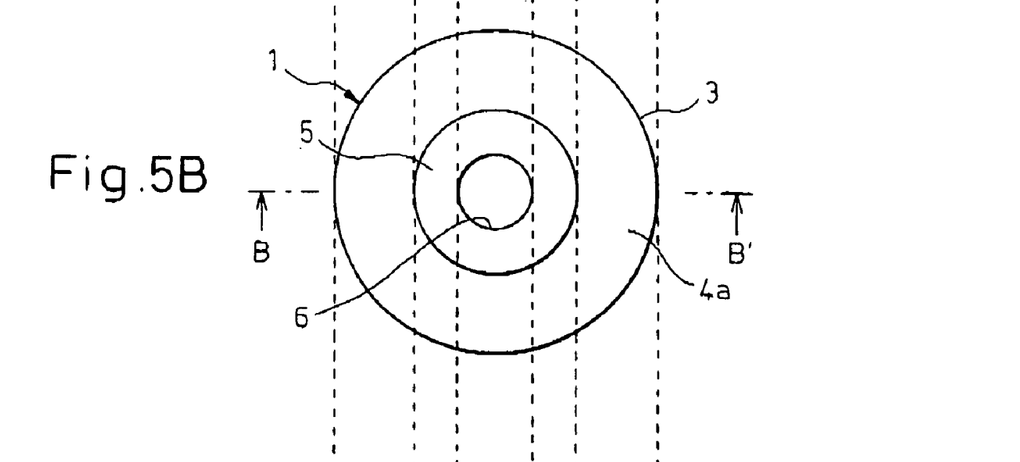
FIG. 5B is a diagram showing the tire condition detecting device 1 in FIG. 5A when viewed in the direction of the arrow A.
Figure 5C:
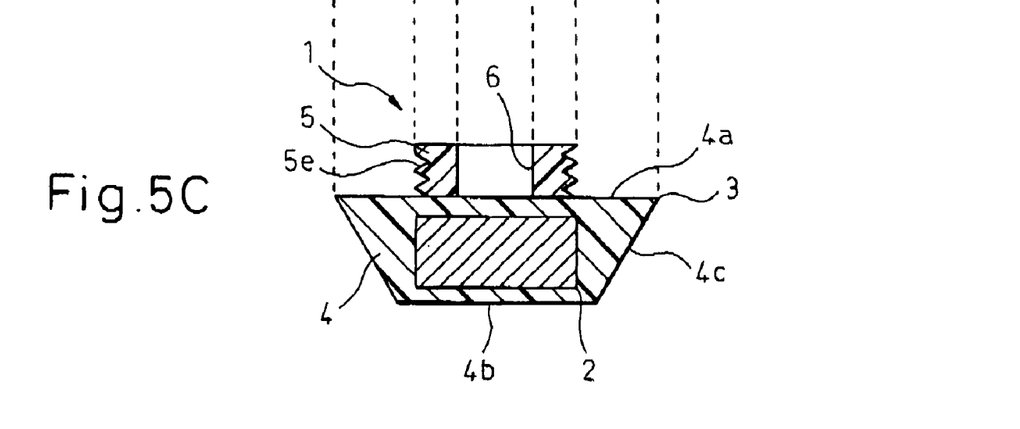
FIG. 5C is a sectional view of the tire condition detecting device 1 along the B-B' line in FIG. 5B.

FIGS. 5A, 5B, and 5C show a tire condition detecting device 1 according to a third embodiment of the present invention. FIGS. 5A, 5B, and 5C correspond to FIGS. 1A, 1B, and 1C, respectively. In FIGS. 5A to 5C, the same symbols used in FIGS. 1A to 1C are attached to the same components as those in FIG. 1A to 1C.

In the first and second embodiments, the case where the insertion part 5 has a structure in which it is inserted into the hole 13 of the rim 12 is explained as an example, but it is also possible for the insertion part 5 to have a structure in which it is screwed into the hole 13 of the rim 12.

In the case of the tire condition detecting device 1 in the present embodiment, the curved surface of the cylindrical insertion part 5 is provided with a screw groove 5e, as shown in FIGS. 5A and 5C. Moreover, although not shown, the curved surface making up the hole 13 of the rim 12 is also provided with a screw groove corresponding to the screw groove 5e of the insertion part 5.

Then, the tire condition detecting device 1 is attached to the rim 12 by screwing the insertion part 5 into the hole 13 of the rim 12.

By attaching the tire condition detecting device 1 to the rim 12 in this manner, it is also possible to prevent the tire condition detecting device 1 from being separated from the rim 12 even if the internal pressure of the tire 14 acts thereon.

Moreover, by making the tire condition detecting device 1 have a structure of screw attachment type as described above, it is possible to increase the strength of attachment of the tire condition detecting device 1 to the wheel 10 compared to the case of the tire condition detecting device 1 in the second embodiment.

Other Embodiments

Figure 6:
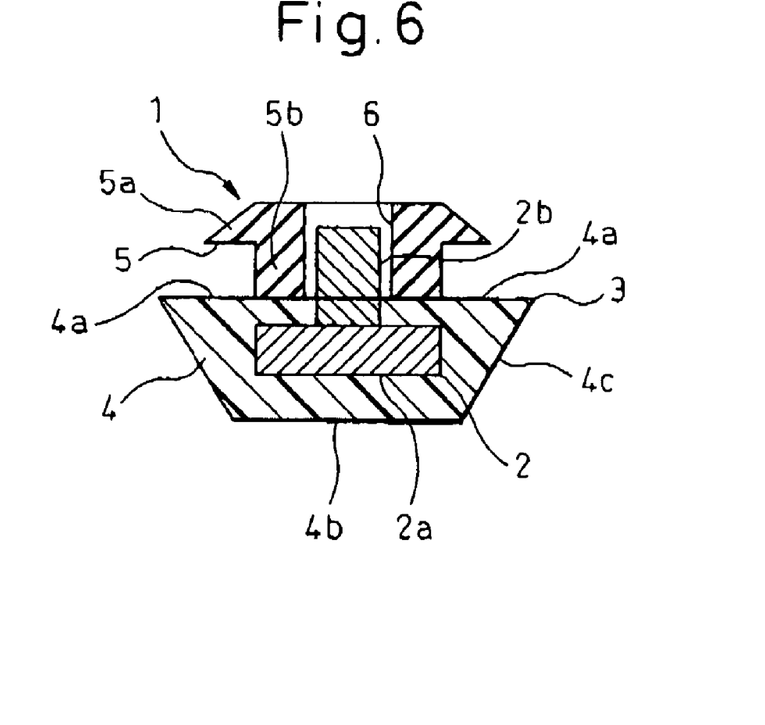
FIG. 6 is a sectional view of a tire condition detecting device 1 in another embodiment of the present invention.
Figure 7:
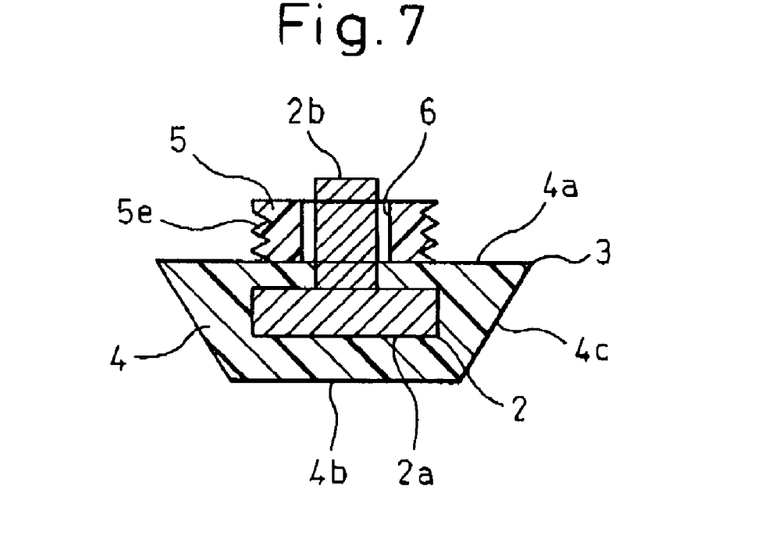
FIG. 7 is a sectional view of a tire condition detecting device 1 in another embodiment of the present invention.

FIGS. 6 and 7 show tire condition detecting devices 1 according to other embodiments of the present invention. FIG. 6 corresponds to a tire condition detecting device 1 the insertion part 5 of which shown in FIG. 1C has the flange-shaped part 5a and FIG. 7 corresponds to a tire condition detecting device 1 the insertion part 5 of which shown in FIG. 4C is of a screw type.

In the first and second embodiments, the tire condition detecting device 1, the sensor and transmission section 2 of which is contained in the case main body 4, is explained as an example, but it is also possible to arrange the sensor so as to protrude to the tire 14 side from the inside of the case main body 4.

In other words, as shown in FIGS. 6 and 7, the sensor 2b can be arranged in the center of the insertion part 5 in a state in which the transmission part 2a is contained in the case main body 4. When the tire condition detecting device 1 like this is attached to the rim 12, the sensor 2b may be located flush with the rim 12 or so as to protrude to the air chamber 15 side from the rim 12.

As described above, it is also possible to arrange the sensor 2b to protrude to the air chamber 15 side from the inner surface 12a of the rim 12.

In each of the embodiments described above, although the case where the case main body 4 is made of resin and the transmitting antenna is contained in the case main body 4 is explained as an example, it is also possible to make the case main body 4 itself function as an antenna by making the case main body 4 of a conductive material.

In this case, the case main body 4 is made of, for example, a metal material. Then, the transmission part 2a contained in the case main body 4 and the case main body 4 are brought into conduction electrically. Moreover, an insulation material such as rubber or resin is arranged between the rim 12 and the case main body 4. Due to this, the rim 12 and the case main body 4 are electrically insulated from each other.

In each of the embodiments described above, the case where the top surface 4a of the case main body 4 and the hole 13 of the rim 12 are circular is explained as an example, but these can have another shape, and are not limited to a circle only.

In each of the embodiments described above, the case where one antenna on a vehicle side is mounted on a vehicle is explained as an example, but the present invention can be applied to a case where two or more antennas on a vehicle side are mounted on a vehicle such as a case where each antenna on a vehicle side is mounted on each wheel house (well).

While the invention has been described by reference to specific embodiments chosen for the purposes of illustration, it should be apparent that numerous modifications could be made thereto by those skilled in the art without departing from the basic concept and scope of the invention.

What is claimed is:

1. An attaching method of a tire condition detecting device, wherein:
    a case has an insertion part to be inserted into a hole, different from a vent hole of a tire valve and provided in a rim of a wheel, and a main body, and
    contains a detection means for detecting condition of a tire and a transmission means for transmitting detection result of the detection means by radio waves; and wherein
    in a state in which the transmission means is contained in the main body, the tire condition detecting device is attached to the rim by inserting the insertion part into the hole of the rim from a side of the rim opposite to a side on which an air chamber is located so that the main body is located on the side of the rim opposite to the side on which the air chamber is located; and
    the main body is provided with a flat surface coming into contact with a peripheral area of the hole which is an inner surface of the rim.

2. The attaching method of a tire condition detecting device as set forth in claim 1, wherein:
    the main body has a bulging part bulging out from the insertion part when the case is viewed in a direction opposite to a direction in which the insertion part is inserted into the hole of the rim; and
    the tire condition detecting device is attached to the rim in a state in which the bulging part is in contact with a surface of the rim on a side opposite to a side on which the air chamber is located.

3. The attaching method of a tire condition detecting device as set forth in claim 1, wherein:
    the tire condition detecting device has a protruding part at a front end of the insertion part, the protruding part protruding in a direction perpendicular to a direction in which the insertion part is inserted into the hole of the rim; and
    the tire condition detecting device is attached to the rim in a state in which, when the insertion part is inserted into the hole of the rim, the protruding part is in contact with an area around the hole of the rim on the surface of the rim at an air chamber side of the rim.

4. The attaching method of a tire condition detecting device as set forth in claim 1, wherein:
    a screw groove is provided on a surface of the insertion part; and
    the tire condition detecting device is attached to the rim by screwing the insertion part into the hole of the rim.

5. The attaching method of a tire condition detecting device as set forth in claim 1, wherein a hole is formed in the insertion part located on an air chamber side on the rim so that a sensor in the main body located on an opposite side of the air chamber on the rim can measure pressure in the air chamber of the tire.

6. A tire condition detecting device to be attached by being inserted into a hole, different from a vent hole of a tire valve and provided in a rim of a wheel, from a side of the rim opposite to a side on which an air chamber of the tire is located, comprising:

a case having an insertion part to be inserted into the hole of the rim and a main body to be arranged on a side of the rim opposite to a side on which the air chamber is located;

a detection means contained in the case and detecting tire condition through the hole of the rim; and a transmission means contained in the main body of the case and transmitting detection result detected by the detection means by radio waves; wherein the main body is provided with a flat surface coming into contact with a peripheral area of the hole which is an inner surface of the rim.

7. The tire condition detecting device as set forth in claim 6, wherein the main body has a shape having a bulging part bulging out from the insertion part when the case is viewed in a direction opposite to a direction in which the insertion part is inserted into the hole of the rim.

8. The tire condition detecting device as set forth in claim 6, wherein the insertion part has a shape having a protruding part at the front end thereof, the protruding part protruding in a direction perpendicular to a direction in which the insertion part is inserted into the hole of the rim.

9. The tire condition detecting device as set forth in claim 6, wherein a surface of the insertion part is provided with a screw groove.

10. The tire condition detecting device as set forth in claim 6, wherein a hole is formed in the insertion part located on an air chamber side on the rim so that a sensor in the main body located on an opposite side of the air chamber on the rim can measure pressure in the air chamber of the tire.

11. A tire condition monitoring system comprising:

a detection means attached to a wheel and detecting tire condition;

a transmission means attached to the wheel and transmitting detection result detected by the detection means by radio waves; and a receiving means mounted on a vehicle, receiving the radio waves, and outputting a directive signal to a notifying means to notify the receiving means of the tire condition, wherein:

the detection means and the transmission means are contained in a case having an insertion part to be inserted into a hole, different from a vent hole of a tire valve and provided in a rim of the wheel;

in a state in which the transmission means is arranged on a side of the rim opposite to a side on which an air chamber is located, the case is attached to the rim by inserting the insertion part into the hole of the rim from the side of the rim opposite to the side on which the air chamber is located; and the main body is provided with a flat surface coming into contact with a peripheral area of the hole which is an inner surface of the rim.

12. The tire condition monitoring system as set forth in claim 11, wherein:

the case has a bulging part bulging out from the insertion part when the case is viewed in a direction opposite to a direction in which the insertion part is inserted into the hole of the rim; and the case is attached to the rim in a state in which the bulging part is in contact with the surface of the rim opposite to a side on which the air chamber is installed.

13. The tire condition monitoring system as set forth in claim 11, wherein:

the insertion part has a protruding part at a front end thereof, the protruding part protruding in a direction perpendicular to a direction in which the insertion part is inserted into the hole of the rim; and the case is attached to the rim in a state in which the protruding part of the insertion part is in contact with an area around the hole of the rim on a surface of the rim at an air chamber side of the rim.

14. The tire condition monitoring system as set forth in claim 11, wherein:

a surface of the insertion part and a surface provided with the hole of the rim are provided with screw grooves corresponding to each other; and the case is attached to the rim by screwing the insertion part into the hole of the rim.

15. The tire condition monitoring system as set forth in claim 11, wherein a hole is formed in the insertion part located on an air chamber side on the rim so that a sensor in the main body located on an opposite side of the air chamber on the rim can measure pressure in the air chamber of the tire.

* * * * *